(12) United States Patent
Sumioka et al.

(10) Patent No.: US 8,574,758 B2
(45) Date of Patent: *Nov. 5, 2013

(54) POROUS ELECTRODE SUBSTRATE AND METHOD FOR PRODUCING THE SAME

(75) Inventors: Kazuhiro Sumioka, Aichi (JP); Yoshihiro Sako, Hiroshima (JP)

(73) Assignee: Mitsubishi Rayon Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/379,368

(22) PCT Filed: Jul. 8, 2010

(86) PCT No.: PCT/JP2010/061583
§ 371 (c)(1),
(2), (4) Date: Dec. 20, 2011

(87) PCT Pub. No.: WO2011/004853
PCT Pub. Date: Jan. 13, 2011

(65) Prior Publication Data
US 2012/0100456 A1 Apr. 26, 2012

(30) Foreign Application Priority Data
Jul. 8, 2009 (JP) ................................ 2009-161694

(51) Int. Cl.
*H01M 4/00* (2006.01)
(52) U.S. Cl.
USPC ........................................................ 429/209
(58) Field of Classification Search
None
See application file for complete search history.

(56) References Cited

U.S. PATENT DOCUMENTS

| 6,713,034 | B2 | 3/2004 | Nakamura et al. | |
|---|---|---|---|---|
| 7,297,445 | B2 | 11/2007 | Nakamura et al. | |
| 7,510,626 | B2 | 3/2009 | Hamada et al. | |
| 7,959,750 | B2 | 6/2011 | Nishida et al. | |
| 2002/0029842 | A1 | 3/2002 | Nishida et al. | |
| 2004/0227265 | A1 | 11/2004 | Nishida et al. | |
| 2007/0166524 | A1* | 7/2007 | Nakamura et al. | 428/292.1 |
| 2007/0218346 | A1 | 9/2007 | Ji et al. | |

(Continued)

FOREIGN PATENT DOCUMENTS

| EP | 1 788 651 | 5/2007 |
|---|---|---|
| EP | 2 395 585 | 12/2011 |

(Continued)

OTHER PUBLICATIONS

Machine Translation of JP 2009-129634A.*

(Continued)

Primary Examiner — Patrick Ryan
Assistant Examiner — Wyatt McConnell
(74) Attorney, Agent, or Firm — Oblon, Spivak, McClelland, Maier & Neustadt, L.L.P.

(57) ABSTRACT

The present invention provides a porous electrode substrate that has low production cost, high mechanical strength, thickness precision, and surface smoothness, and sufficient gas permeability and electrical conductivity, and a method for producing the same. In the present invention, for example, a porous electrode substrate that includes short carbon fibers (A) joined together via three-dimensional mesh-like carbon fibers (B) is produced by a method including a step (1) of dispersing short carbon fibers (A), and short carbon fiber precursors (b) to be fibrillated by beating, to produce a precursor sheet; and a step (2) of subjecting the precursor sheet to carbonization treatment at a temperature of 1000° C. or higher.

23 Claims, 1 Drawing Sheet

(56) References Cited

U.S. PATENT DOCUMENTS

| | | |
|---|---|---|
| 2008/0038589 A1 | 2/2008 | Nakamura et al. |
| 2011/0226431 A1 | 9/2011 | Nishida et al. |
| 2011/0294036 A1 | 12/2011 | Sumioka et al. |

FOREIGN PATENT DOCUMENTS

| | | |
|---|---|---|
| JP | 2001 146633 | 5/2001 |
| JP | 2007 273466 | 10/2007 |
| JP | 2008 179922 | 8/2008 |
| JP | 2009 129834 | 6/2009 |
| WO | 01 56103 | 2/2001 |
| WO | 02 42534 | 5/2002 |

OTHER PUBLICATIONS

International Search Report Issued Oct. 12, 2010 in PCT/JP10/61583 Filed Jul. 8, 2010.

U.S. Appl. No. 13/384,729, filed Jan. 18, 2012, Sumioka, et al.

U.S. Appl. No. 13/390,577, filed Feb. 15, 2012, Sumioka, et al.

Supplementary European Search Report, issued Mar. 11, 2013 in connection with European Application No. 10 79 7164, filed Jul. 8, 2010.

* cited by examiner

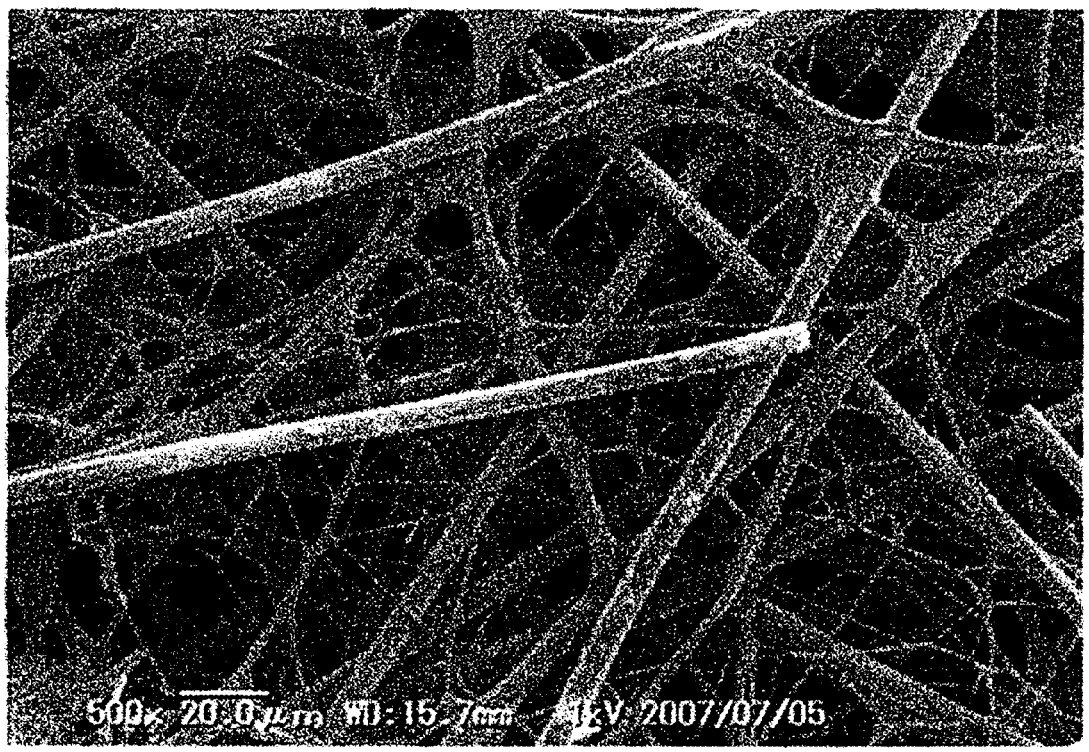

POROUS ELECTRODE SUBSTRATE AND METHOD FOR PRODUCING THE SAME

TECHNICAL FIELD

The present invention relates to a porous electrode substrate used for a fuel cell, and a method for producing the same.

BACKGROUND ART

A gas diffusion electrode substrate installed in a fuel cell has conventionally been a porous electrode substrate composed of a paper-like carbon/carbon composite which was obtained by forming short carbon fibers into a paper, then binding the short carbon fibers to each other via an organic polymer, and firing the paper at high temperature to carbonize the organic polymer, in order to increase mechanical strength (see Patent Literature 1). In addition, for the purpose of achieving lower cost, a porous electrode substrate which was obtained by forming oxidized short fibers into a paper, and firing the paper at high temperature to carbonize the oxidized short fibers is proposed (see Patent Literature 2). Further, a proposal has been made (see Patent Literature 3) for mat that includes a plurality of carbon fibers; and a gas diffusion layer for a fuel cell that is obtained by incorporating a plurality of acrylic pulp fibers into the carbon fiber mat and then by curing and carbonizing them.

CITATION LIST

Patent Literature

Patent Literature 1: International Publication No. WO 2001/056103
Patent Literature 2: International Publication No. WO 2002/042534
Patent Literature 3: JP2007-273466A

SUMMARY OF INVENTION

Technical Problem

However, although the porous carbon electrode substrate disclosed in Patent Literature 1 has high mechanical strength and surface smoothness, and sufficient gas permeability and electrical conductivity, a problem of the porous carbon electrode substrate is that the production process is complicated, and therefore, the production cost increases. The method for producing a carbon fiber sheet disclosed in Patent Literature 2 can achieve lower cost, but problems of the method are that shrinkage during firing is large, and therefore, uneven thickness of the obtained porous electrode substrate is large, and undulation of the sheet is large. The porous electrode substrate disclosed in Patent Literature 3 can achieve lower cost, but a problem of the porous electrode substrate is that there is a little tangling of the carbon fibers with the acrylic pulp in sheeting, and therefore, handling is difficult. In addition, the acrylic pulp has little polymer molecular orientation, compared with fibrous materials, and therefore, the carbonization rate during carbonization is low, and it is necessary to add much acrylic pulp in order to increase the handling properties.

It is an object of the present invention to overcome the problems as described above and provide a porous electrode substrate that has low production cost, high thickness precision and surface smoothness, sufficient handling properties, and sufficient gas permeability and electrical conductivity, and a method for producing the same.

Solution to Problem

The present inventors have found that the above problems can be solved by the following inventions 1) to 7).
1) A method for producing a porous electrode substrate, including a step (1) of dispersing short carbon fibers (A), and short carbon fiber precursors (b) to be fibrillated by beating, to produce a precursor sheet; and a step (2) of subjecting the precursor sheet to carbonization treatment at a temperature of 1000° C. or higher.
2) The method for producing a porous electrode substrate according to the above 1), including a step (3) of subjecting the precursor sheet to hot press forming at a temperature lower than 200° C. between step (1) and step (2).
3) The method for producing a porous electrode substrate according to the above 2), including a step (4) of subjecting the precursor sheet after hot press forming to oxidation treatment at a temperature of 200° C. or higher and lower than 300° C. between step (3) and step (2).
4) A porous electrode substrate produced by a method for producing a porous electrode substrate according to any of the above 1) to 3).
5) A porous electrode substrate including short carbon fibers (A) joined together by three-dimensional mesh-like carbon fibers (B).
6) A membrane electrode assembly using a porous electrode substrate according to the above 4) or 5).
7) A polymer electrolyte fuel cell using a membrane electrode assembly according to the above 6).

Advantageous Effects of Invention

The present invention can provide a porous electrode substrate that has low production cost, high thickness precision and surface smoothness, sufficient handling properties, and sufficient gas permeability and electrical conductivity. In addition, based on the method for producing a porous electrode substrate according to the present invention, the above porous electrode substrate can be produced at low cost.

BRIEF DESCRIPTION OF DRAWING

FIG. 1 is a scanning electron micrograph of a surface of the porous electrode substrate of the present invention.

DESCRIPTION OF EMBODIMENTS

<Porous Electrode Substrate>
In the porous electrode substrate of the present invention, short carbon fibers (A) are joined together via three-dimensional mesh-like carbon fibers (B).

The porous electrode substrate can take the shape of a sheet, a spiral, or the like. In case of the shape of a sheet, the basis weight of the porous electrode substrate is preferably about 15 to 100 g/m², the void ratio is preferably about 50 to 90%, the thickness is preferably about 50 to 300 µm, and the undulation is preferably less than 5 mm.

The gas permeability of the porous electrode substrate is preferably 500 to 20000 ml/hr/cm²/mmAq. In addition, the electrical resistance in the thickness direction (through-plane electric resistance) of the porous electrode substrate is preferably 50 mΩ·cm² or less. Methods for measuring the gas permeability and through-plane electric resistance of the porous electrode substrate will be described later.

<Short Carbon Fibers (A)>

Examples of short carbon fibers (A) constituting a porous electrode substrate include those obtained by cutting carbon fibers, such as polyacrylonitrile-based carbon fibers (hereinafter referred to as "PAN-based carbon fibers"), pitch-based carbon fibers, and rayon-based carbon fibers, to a suitable length. From the viewpoint of mechanical strength of the porous electrode substrate, PAN-based carbon fibers are preferred. The average fiber length of short carbon fibers (A) is preferably about 2 to 12 mm from the viewpoint of dispersibility.

The average diameter of short carbon fibers (A) is preferably 3 to 9 µm from the viewpoint of production cost and dispersibility of the short carbon fibers, and is more preferably 4 to 8 µm from the viewpoint of the smoothness of the porous electrode substrate.

<Dispersion>

Short carbon fibers (A) constituting a porous electrode substrate are usually dispersed in a two-dimensional plane. Here, " dispersed in a two-dimensional plane " means that short carbon fibers (A) are present parallel or substantially parallel to the surface of the sheet-shaped electrode substrate. Because short carbon fibers (A) are dispersed in this manner, it is possible to prevent a short circuit due to short carbon fibers (A), and breakage of short carbon fibers (A). In a two-dimensional plane, short carbon fibers (A) may be substantially randomly orientated, or may be highly orientated in a specific direction.

Short carbon fibers (A) are present in a linear state in the porous electrode substrate. In addition, in the porous electrode substrate, short carbon fibers (A) are not directly joined together, but are joined together via three-dimensional mesh-like carbon fibers (B).

<Three-Dimensional Mesh-like Carbon Fibers (B)>

Three-dimensional mesh-like carbon fibers (B) are fibers that join short carbon fibers (A) together, and are present in a bent state or a curved state at joining portions, and each of carbon fibers (B) forms a three-dimensional mesh-like structure.

The content of three-dimensional mesh-like carbon fibers (B) in the porous electrode substrate is preferably 10 to 90% by mass. In order to maintain sufficient mechanical strength of the porous electrode substrate, the content of three-dimensional mesh-like carbon fibers (B) is more preferably 15 to 80% by mass.

<Method for Producing Porous Electrode Substrate>

A porous electrode substrate of the present invention can be produced, for example, by the following methods.

A first method is a method for sequentially performing step (1) of dispersing short carbon fibers (A), and short carbon fiber precursors (b) to be fibrillated by beating, in a two-dimensional plane to produce a precursor sheet, and step (2) of subjecting the precursor sheet to carbonization treatment at a temperature of 1000° C. or higher. A second method is a method for sequentially performing step (1), step (3) of subjecting the precursor sheet to hot press forming at a temperature lower than 200° C., and step (2). A third method is a method for sequentially performing step (1), step (3), step (4) of subjecting the precursor sheet after hot press forming to oxidation treatment at a temperature of 200° C. or higher and lower than 300° C., and step (2).

<Short Carbon Fiber Precursors (b) to be Fibrillated by Beating>

Short carbon fiber precursors (b) to be fibrillated by beating are long, splittable sea-island composite fibers which are cut into a suitable length, and are able to be beaten by a refiner, a pulper, or the like, and fibrillated.

Short carbon fiber precursors (b) to be fibrillated by beating are produced by using two or more types of different polymers that are dissolved in a common solvent and are incompatible each other, and the residual mass of at least one type of polymer during carbonization treatment step is preferably 20% by mass or more.

Examples of polymers in which the residual mass after carbonization treatment step is 20% by mass or more, and which are used for splittable sea-island composite fibers, include acrylic polymers, cellulosic polymers, and phenolic polymers. Among them, acrylic polymers containing 50% by mass or more of acrylonitrile units are preferable from the viewpoint of spinnability and the residual mass after carbonization treatment step.

Acrylic polymers may be obtained by homopolymerizing acrylonitrile or copolymerizing acrylonitrile and other monomers. Monomers that are copolymerized with acrylonitrile are not particularly limited as long as they are unsaturated monomers constituting general acrylic fibers. Examples of monomers include acrylates typified by methyl acrylate, ethyl acrylate, isopropyl acrylate, n-butyl acrylate, 2-ethylhexyl acrylate, 2-hydroxyethyl acrylate, hydroxypropyl acrylate, and the like; methacrylates typified by methyl methacrylate, ethyl methacrylate, isopropyl methacrylate, n-butyl methacrylate, isobutyl methacrylate, t-butyl methacrylate, n-hexyl methacrylate, cyclohexyl methacrylate, lauryl methacrylate, 2-hydroxyethyl methacrylate, hydroxypropyl methacrylate, diethylaminoethyl methacrylate, and the like; acrylic acid, methacrylic acid, maleic acid, itaconic acid, acrylamide, N-methylolacrylamide, diacetoneacrylamide, styrene, vinyltoluene, vinyl acetate, vinyl chloride, vinylidene chloride, vinylidene bromide, vinyl fluoride, and vinylidene fluoride.

The weight-average molecular weight of acrylonitrile-based polymers is not particularly limited, but is preferably 50000 to 1000000. When the weight-average molecular weight is 50000 or more, there is a tendency for the spinnability to improve, and at the same time, the yarn quality of the fibers is good. When the weight-average molecular weight is 1000000 or less, there is a tendency for the polymer concentration, that provides optimum viscosity of the dope, to increase, and productivity is improved.

When the above-described acrylic polymer is used as the polymer in which the residual mass after carbonization treatment step is 20% by mass or more, among polymers used for the splittable sea-island composite fibers, the polymer other the acrylonitrile-based polymer needs to be dissolved in a solvent common to the acrylonitrile-based polymer and to be stably present in dope. In other words, in the dope, when the degree of incompatibility of two polymers is large, the fibers are heterogeneous, and yarn breakage during spinning is caused, and therefore, the forming of fibers may be impossible. Therefore, the other polymer needs such miscibility that it is incompatible with an acrylonitrile polymer when it is dissolved in a solvent common to the acrylonitrile-based polymer, but a sea-island structure can be formed when spinning is carried out. In addition, in the case of wet spinning, when the other polymer is dissolved in water in a solidification tank and a washing tank, falling off occurs, which is a problem in production, and therefore, the other polymer needs to be poorly soluble in water.

Examples of the other polymer that satisfies these requirements include polyvinyl chloride, polyvinylidene chloride, polyvinylidene fluoride, polyvinylpyrrolidone, cellulose acetate, acrylic resins, methacrylic resins, and phenolic resins. Cellulose acetate, acrylic resins, and methacrylic resins can be preferably used from the viewpoint of the balance of the above-described requirements. One, two or more polymers may be used as the other polymer.

The splittable sea-island composite fibers used as short carbon fiber precursors (b) to be fibrillated by beating can be produced by a usual wet spinning method. When an acrylonitrile polymer is used as the polymer in which the residual mass after carbonization treatment step is 20% by mass or more, the acrylonitrile polymer is mixed with the other polymer, and then, the mixture is dissolved in a solvent to provide dope for splittable sea-island composite fibers. Alternatively, dope obtained by dissolving an acrylonitrile polymer in a solvent, and dope obtained by dissolving the other polymer in a solvent may be mixed by a static mixer or the like to provide dope for splittable sea-island composite fibers. An organic solvent, such as dimethylamide, dimethylformamide, or dimethyl sulfoxide, can be used as the solvent. The splittable sea-island composite fibers can be obtained by spinning these dopes from nozzles, and subjecting the yarns to wet hot drawing, washing, drying, and dry hot drawing.

The cross-sectional shape of short carbon fiber precursors (b) to be fibrillated by beating is not particularly limited. In order to suppress dispersibility, and breakage due to shrinkage during carbonization, the fineness of short carbon fiber precursors (b) to be fibrillated by beating is preferably 1 to 10 dtex.

The average fiber length of short carbon fiber precursors (b) to be fibrillated by beating is preferably 1 to 20 mm from the viewpoint of dispersibility.

Short carbon fiber precursors (b) to be fibrillated by beating are beaten by mechanical external force due to the debonding of phase separation interfaces, and at least portions of them are split and fibrillated. The beating method is not particularly limited. For example, short carbon fiber precursors (b) can be fibrillated by a refiner, a pulper, a beater, or the jet of a pressurized water flow (water jet punching).

The proportion of such short carbon fiber precursors (b) to be fibrillated by beating, which remain as mesh-like carbon fibers (B) in the finally obtained porous electrode substrate, varies depending on the type of short carbon fiber precursors (b), the mixing ratio of short carbon fiber precursors (b) to short carbon fibers (A), and whether or not oxidation treatment at 200° C. or higher and 300° C. or lower is performed. For the mixing ratio of short carbon fibers (A) to short carbon fiber precursors (b) to be fibrillated by beating, short carbon fiber precursors (b) are preferably about 50 to 300 parts by mass, with respect to 100 parts by mass of short carbon fibers (A). When short carbon fiber precursors (b) are 50 parts by mass or more, the amount of formed three-dimensional mesh-like carbon fibers (B) increases, and therefore, strength of the porous electrode substrate sheet is improved. When short carbon fiber precursors (b) are 300 parts by mass or less, it is possible to suppress shrinkage of the sheet due to a small amount of short carbon fibers (A) that suppress shrinkage of short carbon fiber precursors (b) during carbonization, and strength of the porous electrode substrate sheet is improved.

The state of fibrillation changes, depending on the beating method and the beating time when short carbon fiber precursors (b) to be fibrillated by beating are beaten by mechanical external force due to the debonding of phase separation interfaces. As a method for evaluating the degree of fibrillation, freeness evaluation (JIS P8121 (Pulp Freeness Test Method: Canadian standard type)) can be used. The freeness of short carbon fiber precursors (b) to be fibrillated by beating is not particularly limited. As the freeness decreases, there is a tendency for three-dimensional mesh-like carbon fibers (B) to be more easily formed. When sufficient beating is not performed, and short carbon fiber precursors (b), that still have large freeness and that are to be fibrillated by beating, are used, a mixture of three-dimensional mesh-like carbon fibers (B) and porous carbon fibers is produced.

The freeness of short carbon fiber precursors (b) to be fibrillated by beating is preferably 800 cc to 50 cc, and is further preferably 600 cc to 100 cc from the viewpoint that three-dimensional mesh-like carbon fibers (B) are formed, therefore, the strength of the porous electrode substrate sheet is improved, and the dewaterability in producing the precursor sheet by a wet method that will be described later is good.

In addition, the degree of fibrillation can also be evaluated by observing beaten short carbon fiber precursors (b) by a scanning electron microscope. In addition, the degree of fibrillation can also be evaluated by methods for measuring fiber diameter and fiber length of fibril portions, or by sheeting only beaten short carbon fiber precursors (b) and then measuring gas permeability of the sheet that will be described later.

With respect to the control of fibrillation, that is, the control of freeness, treatment conditions in the beating method adopted, the duration of beating treatment, the slurry concentration, and the like can be adjusted by using calibration curves that were drawn previously. Examples of treatment conditions to be adjusted include the shape of disk (blade) of a refiner, the clearance between the disks, and rotation speed when a refiner is used; rotation speed and clearance when a pulper is used; and gear shape, clearance, and speed when a beater is used.

<Step (1) of Producing Precursor Sheet>

Paper making methods, such as a wet method in which short carbon fibers (A) and short carbon fiber precursors (b) to be fibrillated by beating are dispersed in a liquid medium to form a paper, and a dry method in which short carbon fibers (A) and short carbon fiber precursors (b) to be fibrillated by beating are dispersed in air and allowed to fall and accumulate, can be applied as the method for producing the precursor sheet, but the wet method is preferred. Also for helping short carbon fibers (A) to be opened into single fibers, and for preventing the opened single fibers from reconverging, it is preferable to perform wet paper making, using short carbon fiber precursors (b) to be fibrillated by beating, and also using an organic polymer compound as a binder, as required.

Short carbon fiber precursors (b) to be fibrillated by beating may be beaten previously, then mixed with short carbon fibers (A) and dispersed, or alternatively may be mixed with short carbon fibers (A) in an unbeaten state, and then dispersed while being beaten.

Examples of mediums in which short carbon fibers (A) and short carbon fiber precursors (b) to be fibrillated by beating are dispersed, include mediums in which short carbon fiber precursors (b) to be fibrillated by beating are not dissolved, such as water and alcohols. From the viewpoint of productivity, water is preferred.

Examples of methods for mixing short carbon fibers (A), short carbon fiber precursors (b) to be fibrillated by beating, and an organic polymer compound include a method of stirring and dispersing these in water, and a method of directly mixing these. From the viewpoint of uniformly dispersing these, a method of stirring and dispersing these in water is preferred. By mixing short carbon fibers (A), and short carbon fiber precursors (b) to be fibrillated by beating, or further an organic polymer compound as required, and by making paper to produce a precursor sheet, the strength of the precursor sheet is improved. In addition, it is possible to prevent short carbon fibers (A) from coming off the precursor sheet, and prevent the orientation of short carbon fibers (A) from changing, during the production of the precursor sheet.

In addition, the precursor sheet can be produced either by a continuous method or a batch method. From the viewpoint of productivity and mechanical strength of the precursor sheet, it is preferable to produce the precursor sheet by a continuous method.

The basis weight of the precursor sheet is preferably about 10 to 200 g/m$^2$. In addition, the thickness of the precursor sheet is preferably about 20 to 400 μm.

<Organic Polymer Compound>

The organic polymer compound has a role as a binder (glue) for binding each component in a precursor sheet that includes short carbon fibers (A), and short carbon fiber precursors (b) to be fibrillated by beating. However, when short carbon fiber precursors (b) to be fibrillated by beating are used, there is much tangling of short carbon fibers (A) with short carbon fiber precursors (b) to be fibrillated by beating, and therefore, sheeting without using an organic polymer compound is possible. Polyvinyl alcohol (PVA), polyvinyl acetate, or the like can be used as an organic polymer compound. Particularly, polyvinyl alcohol is preferred because it has excellent binding strength during a paper making process, and few amount of short carbon fibers fall off. In the present invention, it is also possible to use an organic polymer compound in a fiber shape.

<Carbonization Treatment Step (2)>

A precursor sheet can be subjected to carbonization treatment as it is, can be subjected to carbonization treatment after being subjected to hot press forming, or can be subjected to carbonization treatment after hot press forming and followed by oxidation treatment. Short carbon fibers (A) are joined by melting short carbon fiber precursors (b) that can be fibrillated by beating, and carbonizing short carbon fiber precursors (b) to provide three-dimensional mesh-like carbon fibers (B), and the obtained porous electrode substrate has high mechanical strength and electrical conductivity.

Carbonization treatment is preferably performed in an inert gas in order to increase the electrical conductivity of the obtained porous electrode substrate. Carbonization treatment is usually performed at a temperature of 1000° C. or higher. The temperature range of carbonization treatment is preferably 1000 to 3000° C., more preferably 1000 to 2200° C. The duration of carbonization treatment is, for example, about 10 minutes to 1 hour. In addition, it is possible to perform a pretreatment of firing in an inert gas at about 300 to 800° C. before carbonization treatment.

When a continuously produced precursor sheet is subjected to carbonization treatment, it is preferable to continuously perform carbonization treatment over the entire length of the precursor sheet, in order to reduce production costs. If a porous electrode substrate has a long length, the productivity of the porous electrode substrate increases, and subsequent MEA production can also be continuously performed, and therefore, the production cost of the fuel cell can be reduced. In addition, in order to increase productivity and to reduce production cost of the porous electrode substrate and the fuel cell, it is preferable to continuously roll up the produced porous electrode substrate.

<Hot Press Forming Step (3)>

In order to join short carbon fibers (A) by melting short carbon fiber precursors (b) to be fibrillated by beating, and in order to reduce uneven thickness of the porous electrode substrate, it is preferable to apply hot press forming to the precursor sheet at a temperature lower than 200° C. before carbonization treatment. For hot press forming, any technique can be applied as long as it can uniformly apply hot press forming to the precursor sheet. Examples of the technique include a method in which a flat and smooth rigid plate is placed on each surface of a precursor sheet and thermally pressed, and a method in which a continuous belt press apparatus is used.

When a continuously produced precursor sheet is hot press formed, the method using a continuous belt press apparatus is preferred. By this method, carbonization treatment can be continuously performed. Examples of pressing methods in the continuous belt press apparatus include a method of applying pressure to a belt with linear pressure by a roll press, and a method of pressing under surface pressure by a hydraulic head press. The latter is preferred from the viewpoint that a smoother porous electrode substrate is obtained.

The heating temperature during hot press forming is preferably lower than 200° C., more preferably 120 to 190° C., in order to effectively make the surface of the precursor sheet smooth.

The forming pressure is not particularly limited. When the content ratio of short carbon fiber precursors (b) to be fibrillated by beating, in the precursor sheet, is high, the surface of the precursor sheet can be easily made smooth even if the forming pressure is low. At this time, if the forming pressure is higher than necessary, the problem of short carbon fibers (A) being broken during hot press forming, the problem of the structure of the porous electrode substrate being too dense, and the like may occur. The forming pressure is preferably about 20 kPa to 10 MPa.

The duration of hot press forming can be, for example, 30 seconds to 10 minutes.

When the precursor sheet, that is sandwiched between two rigid plates, is formed by hot press forming, or when the precursor sheet is formed by hot press forming by using a continuous belt press apparatus, it is preferable to previously apply a release agent to the rigid plates or the belt, or to interpose mold release papers between the precursor sheet and the rigid plates or the belt, so that short carbon fiber precursors (b) to be fibrillated by beating, and the like do not adhere to the rigid plates or the belt.

<Oxidation Treatment Step (4)>

In order to properly join short carbon fibers (A) by melting short carbon fiber precursors (b) to be fibrillated by beating, and in order to improve the carbonization rate of short carbon fiber precursors (b) to be fibrillated by beating, it is preferable to subject the precursor sheet after hot press forming to oxidation treatment at a temperature of 200° C. or higher and lower than 300° C. The temperature of oxidation treatment is more preferably 240 to 270° C.

As the oxidation treatment, continuous oxidation treatment by pressurization and direct heating using a heating perforated plate, or continuous oxidation treatment by intermittent pressurization and direct heating using a heating roll or the like is preferred because they can reduce production costs and they can join short carbon fibers (A) by melting short carbon fiber precursors (b) to be fibrillated by beating.

The duration of oxidation treatment can be, for example, 1 minute to 2 hours.

When a continuously produced precursor sheet is subjected to oxidation treatment, it is preferable to continuously perform oxidation treatment over the entire length of the precursor sheet. By this, carbonization treatment can be continuously performed.

<Membrane Electrode Assembly (MEA) and Polymer Electrolyte Fuel Cell>

The porous electrode substrate of the present invention can be suitably used for a membrane electrode assembly. In addition, a membrane electrode assembly using the porous electrode substrate of the present invention can be suitably used for a polymer electrolyte fuel cell.

EXAMPLES

The present invention will be more specifically described below by Examples. Physical property values and the like in Examples were measured by the following methods. "Parts" means " parts by mass."

(1) Gas Permeability

According to JIS P-8117,the time taken for 200 mL of air to pass through a porous electrode substrate was measured using a Gurley densometer, and the gas permeability (ml/hr/ cm$^2$/mmAq) was calculated.

(2) Thickness

The thickness of a porous electrode substrate was measured by using a thickness measuring apparatus, Dial Thickness Gauge (trade name: 7321, manufactured by Mitutoyo Corporation). The size of the gauge head was 10 mm in diameter, and the measurement pressure was set at 1.5 kPa.

(3) Through-Plane Electric Resistance

A porous electrode substrate was sandwiched between gold-plated copper plates and pressurized from above and below the copper plates at 1 MPa, and the resistance value when current was allowed to flow at a current density of 10 mA/cm$^2$ was measured. The electric resistance in the thickness direction of the porous electrode substrate (through-plane electric resistance) was obtained from the following formula:

[through-plane electric resistance (mΩ·cm$^2$)]= [a measured resistance value (mΩ)]×[sample area (cm$^2$) ]

(4) Content of Three-Dimensional Mesh-like Carbon Fibers (B)

The content of three-dimensional mesh-like carbon fibers (B) was calculated from the basis weight of a porous electrode substrate that was obtained and the basis weight of short carbon fibers (A) that were used, by the following formula:

[the content of three-dimensional mesh-like carbon fibers (B) (%)]=[{the basis weight of a porous electrode substrate (g/m$^2$)}−{the basis weight of short carbon fibers (A) (g/m$^2$)}]÷[the basis weight of a porous electrode substrate (g/m$^2$) ]×100

(5) Undulation of Porous Electrode Substrate

As an indicator of the undulation of a porous electrode substrate, the difference between the maximum value and the minimum value of the height of a porous electrode substrate having a length of 250 mm and a width of 250 mm, was calculated when the porous electrode substrate was left at rest on a flat plate.

(6) Average Fiber Diameter

For the average fiber diameter of short carbon fibers (A), cross sections of short carbon fibers (A) before sheeting were observed by using a scanning electron microscope (SEM), diameters of any 50 of short carbon fibers (A) were measured, and their average value was calculated. Measurement by using an optical microscope (or a microscope) is also possible, and observation at low magnification, by using a scanning electron microscope having a large depth of focus, is effective.

(7) Average Fiber Length

For the average fiber length of short carbon fibers (A), short carbon fibers (A) before sheeting were dispersed in a two-dimensional plane and observed by using an optical microscope (or a microscope), lengths of any 50 of short carbon fibers (A) were measured, and their average value, was calculated. Measurement by using a scanning electron microscope is also possible, and observation by using an optical microscope at low magnification is effective.

(8) Basis Weight

The basis weight of a porous electrode substrate was calculated from the mass of a porous electrode substrate having a length of 250 mm and a width of 250 mm by the following formula:

[the basis weight of the porous electrode substrate (g/m$^2$)]=[the mass of a porous electrode substrate (g)]/0.0625 (m$^2$)

The basis weight of a precursor sheet was calculated from the total mass of short carbon fibers (A) and short carbon fiber precursors (b) that were used during fabricating a precursor sheet having a length of 250 mm and a width of 250 mm, by the following formula:

[the basis weight of a precursor sheet (g/m$^2$)]=[the total mass of short carbon fibers (A) and short carbon fiber precursors (b) that were used (g)]/ 0.0625 (m$^2$)

Example 1

PAN-based carbon fibers having an average fiber diameter of 7 μm and an average fiber length of 3 mm were prepared as short carbon fibers (A). In addition, splittable acrylic sea-island composite short fibers composed of an acrylic polymer and a diacetate (cellulose acetate) (manufactured by MITSUBISHI RAYON CO., LTD., trade name: VONNEL M.V.P.-C651,average fiber length: 6 mm) were prepared as short carbon fiber precursors (b) to be fibrillated by beating.

The above splittable acrylic sea-island composite short fibers were manufactured by the following wet spinning method. Polyacrylonitrile and cellulose acetate with a mass ratio of 70:30 were mixed and dissolved in dimethylacetamide, the temperature of the dope was increased to 80° C., and a constant amount of dope was fed to nozzles, using a gear pump, with the temperature maintained. Then, dope was discharged from the nozzle mouthpieces into a solidification bath composed of a mixed solution of dimethylacetamide and water, and was solidified.

100 Parts of short carbon fibers (A) were uniformly dispersed in water and opened into single fibers. When short carbon fibers (A) were sufficiently dispersed, 250 parts of short carbon fiber precursors (b), that had been sufficiently beaten by a mixer, were added to the dispersion and uniformly dispersed, and these fibers and precursors were manually spread in a two-dimensional plane (length: 250 mm, width: 250 mm), by using a standard square sheet machine (trade name: No. 2555,manufactured by KUMAGAI RIKI KOGYO CO., LTD.), according to the JIS P-8209 method, and dried to obtain a precursor sheet having a basis weight of 38 g/m$^2$. The dispersed state of short carbon fibers (A) and short carbon fiber precursors (b) in the precursor sheet was good.

Then, two of the precursor sheets were laminated. Both surfaces of the precursor sheets were sandwiched between papers that were coated with a silicone-based mold release agent, and then, the laminate sheets were subjected to hot press forming by using a batch press apparatus under the conditions of 180° C. and 3 MPa for 3 minutes. Then, both surfaces of precursor sheets after hot press forming were sandwiched between stainless steel punching plates that were coated with a silicone-based mold release agent, and then, the precursor sheets were subjected to oxidization treatment by using a batch press apparatus under the conditions of 280° C. and 0.5 MPa for 1 minute. Then, the precursor sheets after oxidization treatment were subjected to carbonization treatment in a batch carbonization furnace in a nitrogen gas atmosphere under the condition of 2000° C. for 1 hour to obtain a porous electrode substrate.

The obtained porous electrode substrate had little in-plane shrinkage during carbonization treatment, an undulation as small as less than 2 mm, sufficient handling properties, good gas permeability, good thickness and good through-plane electric resistance. The content of mesh-like carbon fibers (B) was 45% by mass. In addition, as shown in FIG. 1, a scanning electron micrograph of a surface of the obtained porous electrode substrate proved that short carbon fibers (A) dispersed in the two-dimensional plane were joined together via three-dimensional mesh-like carbon fibers (B). The evaluation results are shown in Table 1.

Examples 2, 3 and 4

Porous electrode substrates were obtained in the same manner as in Example 1, except that the used amount of short carbon fiber precursors (b) to be fibrillated by beating, and the basis weight of the precursor sheet were set as shown in Table 1. The obtained porous electrode substrates had little in-plane shrinkage during carbonization treatment, sufficient handling properties, good gas permeability, good thickness and good through-plane electric resistance. In addition, it was proved that short carbon fibers (A) dispersed in the two-dimensional plane were joined together via three-dimensional mesh-like carbon fibers (B). The evaluation results are shown in Table 1.

Example 5

A porous electrode substrate was obtained in the same manner as in Example 1, except that splittable acrylic sea-island composite short fibers having an average fiber length of 3 mm and composed of an acrylic polymer and a methacrylic resin (trade name: VONNEL M.V.P.-C300, manufactured by MITSUBISHI RAYON CO., LTD.) were used as short carbon fiber precursors (b) to be fibrillated by beating, and the basis weight of the precursor sheet was set at 40 g/m$^2$.

The obtained porous electrode substrate had little in-plane shrinkage during carbonization treatment, sufficient handling properties, good gas permeability, good thickness and good through-plane electric resistance. In addition, it was proved that short carbon fibers (A) dispersed in the two-dimensional plane were joined together via mesh-like carbon fibers (B). The evaluation results are shown in Table 1.

Examples 6, 7 and 8

Porous electrode substrates were obtained in the same manner as in Example 5, except that the used amount of short carbon fiber precursors (b), and the basis weight of the precursor sheet were set as values shown in Table 1. The obtained porous electrode substrates had little in-plane shrinkage during carbonization treatment, sufficient handling properties, good gas permeability, good thickness and good through-plane electric resistance. In addition, it was proved that short carbon fibers (A) dispersed in the two-dimensional plane were joined together via mesh-like carbon fibers (B). The evaluation results are shown in Table 1.

Example 9

A porous electrode substrate was obtained in the same manner as in Example 1, except that oxidation treatment was not performed, and that the basis weight of the precursor sheet was set at 36 g/m$^2$. The obtained porous electrode substrate had little in-plane shrinkage during carbonization treatment, sufficient handling properties, good gas permeability, good thickness and good through-plane electric resistance. In addition, it was proved that short carbon fibers (A) dispersed in the two-dimensional plane were joined together via mesh-like carbon fibers (B). The evaluation results are shown in Table 1.

Example 10

A porous electrode substrate was obtained in the same manner as in Example 1, except that neither hot press forming nor oxidation treatment was performed, and that the basis weight of the precursor sheet was set at 36 g/m$^2$. The obtained porous electrode substrate had little in-plane shrinkage during carbonization treatment, sufficient handling properties, good gas permeability, good thickness and good through-plane electric resistance. In addition, it was proved that short carbon fibers (A) dispersed in the two-dimensional plane were joined together via mesh-like carbon fibers (B). The evaluation results are shown in Table 1.

Example 11

(Production of Membrane Electrode Assembly (MEA))

Two of the porous electrode substrates obtained in Example 1 were prepared as porous electrode substrates for a cathode and an anode. In addition, a laminate was prepared in which a catalyst layer (catalyst layer area: 25 cm$^2$, amount of Pt adhered: 0.3 mg/cm$^2$) composed of a catalyst-supporting carbon (catalyst: Pt, amount of the catalyst supported: 50% by mass) was formed on both surfaces of a perfluorosulfonic acid-based polymer electrolyte membrane (membrane thickness: 30 μm). This laminate was interposed between the porous electrode substrates for a cathode and an anode, and these were joined to obtain a MEA.

(Evaluation of Fuel Cell Characteristics of MEA)

The obtained MEA was interposed between two carbon separators having a bellows-like gas flow path to form a polymer electrolyte fuel cell (unit cell).

The fuel cell characteristics were evaluated by measuring the current density-voltage characteristics of the unit cell. A hydrogen gas was used as a fuel gas, and air was used as an oxidizing gas. The temperature of the unit cell was set at 80° C., the utility factor of the fuel gas was set at 60%, and the utility factor of the oxidizing gas was set at 40%. The humidification of the fuel gas and the oxidizing gas was performed by passing the fuel gas and the oxidizing gas through bubblers at 80° C., respectively. As a result, the cell voltage of the fuel cell at a current density of 0.8 A/cm$^2$ was 0.636 V, the internal resistance of the cell was 3.1 mΩ, and the fuel cell exhibited good characteristics.

Comparative Example 1

A porous electrode substrate was obtained in the same manner as in Example 1, except that 133 parts of polyvinyl alcohol (PVA) short fibers having an average fiber length of 3 mm (trade name: VBP105-1, manufactured by KURARAY CO., LTD.) were used as an organic polymer compound, without using the short carbon fiber precursors (b) to be fibrillated by beating, and the basis weight of the precursor sheet was set at 35 g/m$^2$. The obtained porous electrode substrate could not maintain the structure of the sheet shape because PVA had been hardly carbonized, and therefore, short carbon fibers (A) had not been joined together.

Comparative Example 2

A porous electrode substrate was obtained in the same manner as in Example 1, except that short carbon fibers (A)

were not used, 100 parts of the short carbon fiber precursors (b) to be fibrillated by beating were used, 16 parts of polyvinyl alcohol (PVA) short fibers having an average fiber length of 3 mm (trade name: VBP105-1,manufactured by KURARAY CO., LTD.) were used as an organic polymer compound, and the basis weight of the precursor sheet was set at 58 g/m². The obtained porous electrode substrate could not maintain the structure of the sheet shape because short carbon fiber precursors (b) had shrunk during carbonization.

Comparative Example 3

A porous electrode substrate was obtained in the same manner as in Example 1,except that polyacrylonitrile-based precursors having an average fiber diameter of 10 μm and an average fiber length of 3 mm were used instead of short carbon fiber precursors (b) to be fibrillated by beating, polyvinyl alcohol (PVA) short fibers having an average fiber length of 3 mm (trade name: VBP105-1,manufactured by KURARAY CO., LTD.) were used as an organic polymer compound, and the used amount of these materials and the basis weight of the precursor sheet were set as shown in Table 1. In the obtained porous electrode substrate, it was observed that the polyacrylonitrile-based precursors had been broken at binding portions with short carbon fibers (A) due to shrinkage during carbonization, and the value of through-plane electric resistance was larger than that of the porous electrode substrate in Example 1. The evaluation results are shown in Table 1.

Comparative Examples 4, 5 and 6

Porous electrode substrates were obtained in the same manner as in Example 1,except that a polyacrylonitrile-based pulp, which was fabricated by jet solidification and in which a large number of fibrils having a diameter of 3 μm or less branched from fibrous stems, was used instead of short carbon fiber precursors (b) to be fibrillated by beating, and the used amount of these materials and the basis weight of the precursor sheet were set as shown in Table 1. In the obtained porous electrode substrate, it was observed that the fibrous stem portions of the polyacrylonitrile-based pulp had been broken at binding portions with short carbon fibers (A) due to shrinkage during carbonization, and the value of through-plane electric resistance was larger than those of the porous electrode substrates in Examples 1 to 4. In addition, the value of gas permeability was lower than those of the porous electrode substrates in Examples 1 to 4 due to the effect of the shape of the fibrous stem portions of the polyacrylonitrile-based pulp. The evaluation results are shown in Table 1.

TABLE 1

| | Short carbon fibers (A) | Short carbon fiber precursors (b) | | PVA Short fibers | PAN-based precursors | PAN-based pulp | Precursor sheet | Porous electrode substrate | | | | | | |
|---|---|---|---|---|---|---|---|---|---|---|---|---|---|---|
| | | PAN/ diacetate | PAN/ PMMA | | | | Basis weight | Basis weight | Thickness | Undulation | Content of carbon fibers (B) | Gas permeability | Through-plane electric resistance |
| | (parts by mass) | (parts by mass) | (parts by mass) | (parts by mass) | (parts by mass) | (parts by mass) | (g/m²) | (g/m²) | (mm) | (mm) | (%) | (ml/hr/cm²/mmAq) | (mΩ·cm²) |
| Example 1 | 100 | 250 | — | — | — | — | 38 | 37 | 149 | <2 | 45 | 16000 | 8.1 |
| Example 2 | 100 | 83 | — | — | — | — | 30 | 39 | 195 | <2 | 25 | 18000 | 11.2 |
| Example 3 | 100 | 100 | — | — | — | — | 32 | 42 | 201 | <2 | 29 | 18000 | 10.2 |
| Example 4 | 100 | 750 | — | — | — | — | 48 | 37 | 98 | <2 | 73 | 9600 | 4.8 |
| Example 5 | 100 | — | 250 | — | — | — | 40 | 33 | 135 | <2 | 39 | 15000 | 7.8 |
| Example 6 | 100 | — | 83 | — | — | — | 30 | 36 | 170 | <2 | 17 | 19000 | 10.8 |
| Example 7 | 100 | — | 100 | — | — | — | 32 | 40 | 183 | <2 | 25 | 18000 | 9.9 |
| Example 8 | 100 | — | 750 | — | — | — | 48 | 28 | 83 | <2 | 63 | 11000 | 4.9 |
| Example 9 | 100 | 250 | — | — | — | — | 36 | 35 | 148 | <2 | 43 | 17000 | 8.8 |
| Example 10 | 100 | 250 | — | — | — | — | 36 | 35 | 158 | <2 | 41 | 19000 | 9.1 |
| Comparative Example 1 | 100 | — | — | 113 | — | — | 35 | — | — | — | — | — | — |
| Comparative Example 2 | — | 100 | — | 16 | — | — | 58 | — | — | — | — | — | — |
| Comparative Example 3 | 100 | — | — | 53 | 83 | — | 39 | 42 | 225 | <2 | 26 [*1] | 7500 | 12.1 |
| Comparative Example 4 | 100 | — | — | — | — | 270 | 56 | 60 | 206 | <2 | 50 [*1] | 2100 | 14.9 |
| Comparative Example 5 | 100 | — | — | — | — | 100 | 30 | 44 | 198 | <2 | 31 [*1] | 3600 | 14.8 |
| Comparative Example 6 | 100 | — | — | — | — | 630 | 87 | 38 | 135 | <2 | 68 [*1] | 1200 | 14.5 |

[*1] Mesh-like carbon fibers were not formed.

The invention claimed is:

1. A method for producing a porous electrode substrate, comprising:

(1) dispersing short carbon fibers (A), and short carbon fiber precursors (b), to obtain a precursor sheet; and (2) treating the precursor sheet in a carbonization treatment at a temperature of 1000° C. or higher, wherein the short carbon fiber precursors (b) are in the form of sea-island composite fibers, capable of fibrillation by beating, and comprise two or more different polymers.

2. The method of claim 1, further comprising:

(3) hot press forming the precursor sheet at a temperature lower than 200° C. after dispersing the short carbon fibers (A) and the short carbon fiber precursors (b) and before treating the precursor sheet, without impregnating the precursor sheet with a resin which is capable of carbonization before the hot press forming.

3. The method of claim 2, further comprising:
(4) subjecting the precursor sheet to oxidation treatment at a temperature of 200° C. or higher and lower than 300° C. after the hot press forming and before treating the precursor sheet.

4. A porous electrode substrate obtained by a process comprising the method of claim 1.

5. A porous electrode substrate comprising short carbon fibers (A) that are dispersed in a two-dimensional plane and are joined together via only three-dimensional mesh-like carbon fibers (B), wherein the three-dimensional mesh-like carbon fibers (B) are derived from short carbon fiber precursors (b) which are in the form of sea-island composite fibers, capable of fibrillation by beating and comprise two or more different polymers.

6. A membrane electrode assembly comprising the porous electrode substrate of claim 4.

7. A polymer electrolyte fuel cell comprising the membrane electrode assembly of claim 6.

8. A membrane electrode assembly comprising the porous electrode substrate of claim 5.

9. A polymer electrolyte fuel cell comprising the membrane electrode assembly of claim 8.

10. The porous electrode substrate of claim 4, as a sheet or a spiral.

11. The porous electrode substrate of claim 5, as a sheet or a spiral.

12. The method of claim 1, wherein the short carbon fibers (A) are polyacylonitrile-based fibers, pitch-based fibers, or rayon-based fibers, or a combination thereof.

13. The porous electrode substrate of claim 5, wherein the short carbon fibers (A) are polyacylonitrile-based fibers, pitch-based fibers, rayon-based fibers, or a combination thereof.

14. The method of claim 1, wherein an average length of the short carbon fibers (A) is from 2 to 12 mm and an average diameter of the short carbon fibers (A) is from 3 to 9 μm.

15. The porous electrode substrate of claim 5, wherein an average length of the short carbon fibers (A) is from 2 to 12 mm and an average diameter of the short carbon fibers (A) is from 3 to 9 μm.

16. The porous electrode substrate of claim 5, wherein a content of the three-dimensional mesh-like carbon fibers (B) is from 10 to 90% by mass.

17. The method of claim 1, wherein the short carbon fiber precursors (b) comprise an acrylic polymer, a cellulosic polymer, a phenolic polymer, or a combination thereof.

18. The method of claim 1, further comprising wet spinning to obtain the short carbon fiber precursors (b).

19. A porous electrode substrate obtained by a process comprising the method of claim 2.

20. A porous electrode substrate obtained by a process comprising the method of claim 3.

21. The method of claim 1, wherein the short carbon fiber precursors (b) are fibers that have been fibrillated by mechanical beating.

22. The method of claim 1, further comprising, before the dispersing, fibrillating the short carbon fiber precursors (b) by mechanically beating the short carbon fiber precursors (b).

23. The method of claim 2, wherein hot press forming joins short carbon fibers by melting.

* * * * *